(12) United States Patent
Hansen et al.

(10) Patent No.: US 11,213,162 B2
(45) Date of Patent: Jan. 4, 2022

(54) METHOD OF DISPENSING A BEVERAGE, A BEVERAGE PREPARATION MACHINE, AND A SYSTEM

(71) Applicant: Koninklijke Douwe Egberts B.V., Utrecht (NL)

(72) Inventors: Nick Andrew Hansen, Banbury (GB); Simon Carr, Banbury (GB); Geoff York, Banbury (GB); Andrew Halliday, Banbury (GB); Egidijus Bartkus, Whippany, NJ (US)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 14/648,218

(22) PCT Filed: Dec. 6, 2013

(86) PCT No.: PCT/IB2013/002856
§ 371 (c)(1),
(2) Date: May 28, 2015

(87) PCT Pub. No.: WO2014/096947
PCT Pub. Date: Jun. 26, 2014

(65) Prior Publication Data
US 2015/0313402 A1 Nov. 5, 2015

(30) Foreign Application Priority Data
Dec. 19, 2012 (GB) ...................................... 1222935

(51) Int. Cl.
*A47J 31/40* (2006.01)
*A47J 31/56* (2006.01)
(Continued)

(52) U.S. Cl.
CPC ................. *A47J 31/56* (2013.01); *A23F 3/14* (2013.01); *A23F 5/125* (2013.01); *A23F 5/385* (2013.01); *A23L 23/10* (2016.08); *A47J 31/4492* (2013.01)

(58) Field of Classification Search
CPC .. A23F 3/14; A23F 5/125; A23F 5/385; A23F 2200/00; A23L 23/10;
(Continued)

(56) References Cited

U.S. PATENT DOCUMENTS 3,937,134 A    2/1976   Molenaar et al.
6,595,108 B1 *   7/2003   Blanc .................. A47J 31/3633
                                                                      99/289 R (Continued)

FOREIGN PATENT DOCUMENTS

AT          511357 A4    11/2012
CA          808588 A      3/1969
(Continued)

OTHER PUBLICATIONS

International Search Report, dated Mar. 20, 2014 for International Application No. PCT/IB 002856 (3 pgs.).

(Continued)

*Primary Examiner* — Hong T Yoo
(74) *Attorney, Agent, or Firm* — Fitch, Even, Tabin & Flannery LLP

(57) ABSTRACT

A method of dispensing a beverage comprising: a) inserting a beverage ingredient tablet (20) into a beverage preparation machine (30); b) measuring a characteristic associated with the thickness of at least a portion of the beverage ingredient tablet (20) to identify the beverage ingredient tablet (20); c) configuring one or more dispense parameters of the beverage preparation machine (30) based on the identification of the beverage ingredient tablet (20); and d) operating the (Continued)

beverage preparation machine (30) to dispense a beverage by contacting the beverage ingredient tablet (20) with an aqueous fluid.

10 Claims, 7 Drawing Sheets

(51) Int. Cl.
    *A23F 5/12*     (2006.01)
    *A23F 3/14*     (2006.01)
    *A23L 23/10*     (2016.01)
    *A47J 31/44*     (2006.01)
    *A23F 5/38*     (2006.01)

(58) Field of Classification Search
    CPC .... A47J 31/4492; A47J 31/56; A47J 31/3623; A47J 31/3676; A47J 31/407; A47J 31/0668; A47J 31/0642; A47J 31/3642; A47J 31/40; A47J 31/4403; A47J 31/5251; A47J 31/5255
    See application file for complete search history.

(56) References Cited

U.S. PATENT DOCUMENTS

| | | | |
|---|---|---|---|
| 2002/0048621 A1 | 4/2002 | Boyd et al. | |
| 2005/0022674 A1 | 2/2005 | Campbell et al. | |
| 2010/0132564 A1 | 6/2010 | Ozanne et al. | |
| 2010/0260915 A1* | 10/2010 | Young | A23F 5/125 426/595 |
| 2011/0297002 A1 | 12/2011 | Vitel et al. | |
| 2012/0098526 A1* | 4/2012 | Bucher | A47J 31/3623 324/204 |
| 2012/0251677 A1* | 10/2012 | Yoakim | B65D 85/8043 426/112 |

FOREIGN PATENT DOCUMENTS

| | | |
|---|---|---|
| EP | 1440639 A1 | 7/2004 |
| EP | 2071986 A1 | 6/2009 |
| JP | 2011510034 | 3/2011 |
| JP | 2012531228 A | 12/2012 |
| JP | 2013512742 A | 4/2013 |
| JP | 2013532498 A | 8/2013 |
| WO | 2005063091 A1 | 7/2005 |
| WO | 2009081250 A2 | 7/2009 |
| WO | 2009092601 | 7/2009 |
| WO | 2011000725 A1 | 1/2011 |
| WO | 2011023711 A1 | 3/2011 |
| WO | 2011069830 A1 | 6/2011 |
| WO | 2012001106 A2 | 1/2012 |
| WO | 2012010470 A1 | 1/2012 |
| WO | 2012066313 | 5/2012 |
| WO | 2012080112 | 6/2012 |
| WO | 2012123440 | 9/2012 |
| WO | 2013046149 A1 | 4/2013 |

OTHER PUBLICATIONS

Search and Exam Report, dated May 21, 2013, for Application No. GB1222935.7 (4 pgs.).
Notification of Grant, dated Oct. 21, 2014 for Application No. GB1222935.7 (2 pgs.).
Russian Patent Office, Office Action and English Translation dated Jun. 17, 2016, from Russian Patent Application No. 2015114367, 10 pages.
Notice of Reasons for Rejection dated Apr. 13, 2016 for Japanese Patent Application No. 2015-544555 with English translation (9 pgs.).
Decision to Grant a Patent, dated Aug. 19, 2016, for Patent Application No. JP2015-544555, with Englisth translation (6 pgs.).
Written Argument, dated Jul. 14, 2016, for Patent Application No. JP2015-544555, with English translation (5 pgs.).
Korean Intellectual Property Office, English translation of Notification of Reason for Refusal, dated Sep. 28, 2017 for Korean Patent Application No. 10-2015-7015263 (5 pages).
Commuicaiton from the Examining Divsion, dated Dec. 8, 2016 for European Patent Appliction No. 13819071.5 (4 pgs.).
Notification of Reason for Refusal dated Nov. 16, 2016 for Korean Patent Application No. 10-2015-7015263, with English translation (9 pgs.).
Response to European Patent Office Communication pursant to Rules 161(1) and 162 EPC issued on Jul. 30, 2015, dated Feb. 2, 2016 for European Patent Appliction No. 13819071.5 (15 pgs.).

* cited by examiner

METHOD OF DISPENSING A BEVERAGE, A BEVERAGE PREPARATION MACHINE, AND A SYSTEM

CROSS REFERENCE TO RELATED APPLICATIONS

This application is a U.S. national phase application of International Application No. PCT/IB2013/002856, filed Dec. 6, 2013, which claims benefit from United Kingdon Application 1222935.7, filed Dec. 19, 2012, which are each hereby incorporated herein by reference in their entirety.

FIELD

The present disclosure relates to a method of dispensing a beverage, a beverage preparation machine and a system.

BACKGROUND

Machines for dispensing beverages are well known. For example, it is known to produce coffee-based beverages using drip-filter machines and espresso machines. Such machines may use roasted ground coffee which may be provided in loose form or in individual filter-wrapped doses in the form of pods or pouches.

Roasted ground coffee may also be formed into tablets, for example as described in CA808588. Typically, the coffee tablet is formed from pressed and compacted roasted ground coffee. The high compaction pressures used result in a coffee tablet that retains its shape during normal handling without the need for any overwrap or cover. Such coffee tablets may be used in espresso machines and filter machines.

In more recent times 'on-demand' beverage machines have been marketed which allow for beverages to be produced on an individual basis as required by a user from individual sealed capsules, cartridges or flexible bags of ground coffee. Still more recently, beverage machines allowing for convenient, on demand dispensation of a range of beverage types have been produced. One example of such a system is marketed under the brand name TASSIMO® by Kraft Foods, Inc. This system (as described in EP1440639) utilises a beverage preparation machine that comprises a barcode reader and a range of beverage cartridges wherein each beverage cartridge contains one or more beverage ingredients and is coded with a barcode. In use, the barcode reader of the beverage machine scans and reads the barcode on a beverage cartridge after it is inserted into the machine and uses information decoded from the barcode to set one or more dispensation parameters of the beverage machine for that dispensation cycle.

BRIEF SUMMARY OF THE DISCLOSURE

According to the present disclosure there is provided a method of dispensing a beverage comprising:

a) inserting a beverage ingredient tablet into a beverage preparation machine;

b) measuring a characteristic associated with the thickness of at least a portion of the beverage ingredient tablet to identify the beverage ingredient tablet;

c) configuring one or more dispense parameters of the beverage preparation machine based on the identification of the beverage ingredient tablet; and d) operating the beverage preparation machine to dispense a beverage by contacting the beverage ingredient tablet with an aqueous fluid.

Advantageously, the method allows the dispense parameters to be tailored to the requirements of each type of beverage ingredient tablet unlike prior art methods of using beverage ingredient tablets which cannot readily distinguish between different tablet types.

The one or more dispense parameters may be selected from the group comprising: temperature of the aqueous fluid; volume of the aqueous fluid dispensed; flow rate of the aqueous fluid; pressure of the aqueous fluid; and presence or absence of a pre-wet stage.

In step b) a characteristic associated with the overall thickness of the beverage ingredient tablet from an uppermost surface to a lowermost surface may be measured.

Alternatively, the beverage ingredient tablet may comprise a recess in at least one exterior surface and in step b) a characteristic associated with the thickness of the beverage ingredient tablet between a bottom of the recess and an opposed exterior face may be measured.

Using a characteristic associated with the thickness of at least a part of the beverage ingredient tablet itself for identification avoids the need to provide a separate identifier, such as a label or cover. This results in less environmental waste and a simplified manufacturing and utilisation process.

The characteristic associated with the thickness of at least a portion of the beverage ingredient tablet may be measured using a displaceable probe.

The present disclosure also provides a beverage preparation machine comprising:

a chamber for receiving a beverage ingredient tablet;

a source of aqueous fluid;

a heater for varying the temperature of the aqueous fluid;

a sensor for measuring for measuring a characteristic associated with the thickness of at least a portion of the beverage ingredient tablet in use;

a controller associated with the source of aqueous fluid, the heater and the sensor;

the controller being programmed to identify the beverage ingredient tablet based on the characteristic measurement and configure one or more dispense parameters of the beverage preparation machine based on said identification.

The one or more dispense parameters configured by the controller may be selected from the group comprising: temperature of the aqueous fluid; volume of the aqueous fluid dispensed; flow rate of the aqueous fluid; pressure of the aqueous fluid; and presence or absence of a pre-wet stage.

The sensor may be configured to measure a characteristic associated with the overall thickness of the beverage ingredient tablet from an uppermost surface to a lowermost surface.

Alternatively, the beverage ingredient tablet to be used may comprise a recess in at least one exterior surface and the sensor may be configured to measure a characteristic associated with the thickness of the beverage ingredient tablet between a bottom of the recess and an opposed exterior face.

The sensor may comprise a displaceable probe. The displaceable probe may comprise a probe part and a movement-sensing part.

The movement-sensing part may comprise a roller part engageable with the probe part, wherein displacement of the probe part causes the roller part to rotate, the degree of rotation being a characteristic associated with the thickness of at least a portion of the tablet, wherein the roller part produces an output signal associated with the degree of displacement of the probe part.

Alternatively, the movement-sensing part may comprise an optical detector and the probe part may comprise a series of graduations, wherein displacement of the probe part causes the graduations to move past the optical detector, the number of graduations passing the detector being a characteristic associated with the thickness of at least a portion of the tablet, thereby allowing the optical detector to produce an output signal associated with the degree of displacement of the probe part.

The graduations on the probe part may be in any form discernable by the optical detector. Examples include a plurality of spaced printed lines, a series of spaced raised protuberances, a series of spaced grooves.

The displaceable probe may also use mechanical sensing of the degree of movement of the probe part. For example, the probe part may comprise a series of raised protuberances and the movement-sensing part may comprise a series of switches which can be switched on engagement by the protuberances.

The displaceable probe may be associated with the chamber and be located underneath the location of the beverage ingredient tablet. In this case, the beverage ingredient tablet may be displaced along with the probe part by the closing of the brew chamber. In one example, a lower part of the brew chamber remains stationary and the probe part and movement-sensing part are associated with the lower part. An upper part of the brew chamber is movable between an open position to allow insertion of the beverage ingredient tablet and a closed position to seal the brew chamber. On closure of the upper part of the brew chamber the beverage ingredient tablet is contacted and the tablet and probe part are displaced relative to the movement-sensing part and a remainder of the lower part.

Alternatively, the displaceable probe may be associated with the chamber and the displaceable probe be located above the location of the beverage ingredient tablet. In this case, the beverage ingredient tablet may remain stationary during measurement. In one example, a lower part of the brew chamber remains stationary. An upper part of the brew chamber is movable between an open position to allow insertion of the beverage ingredient tablet and a closed position to seal the brew chamber. The probe part and movement-sensing part are associated with the upper part. On closure of the upper part of the brew chamber the beverage ingredient tablet is contacted but is not displaceable. Hence the probe part is displaced relative to the movement-sensing part and the remainder of the upper part of the brew chamber. In another example, a lower part of the brew chamber again remains stationary. An upper part of the brew chamber comprises a projection shaped to be accommodated in a recess of the beverage ingredient tablet. The upper part is movable between an open position to allow insertion of the beverage ingredient tablet and a closed position to seal the brew chamber. The probe part and movement-sensing part are associated with the lower part. On closure of the upper part of the brew chamber the beverage ingredient tablet is contacted by the projections and is displaced along with the probe part relative to the movement-sensing part and the remainder of the lower part of the brew chamber.

The present disclosure also provides a system comprising a beverage preparation machine as described above and a beverage ingredient tablet.

The beverage ingredient tablet may comprise a compacted powder tablet containing one or more powdered beverage ingredients.

The beverage ingredient tablet may comprise a recess in at least one exterior surface.

The beverage ingredient tablet may comprise one or more ingredients in varying proportions. The ingredients may include, amongst others: roasted ground coffee, soluble coffee, soluble tea, milk powder, non-dairy whitener, sugar, artificial sweeteners. The beverage ingredient tablet may include one or more additives for colouring the tablet. The beverage ingredient tablet may in addition include binders or other excipients such as starches, maltodextrin and carboxymethylcellulose.

The beverage ingredient tablet may take any desired geometric form, for example, a cross-section which is circular, square, rectangular or oval.

While it is preferably to measure a characteristic associated with the thickness of the beverage ingredient tablet in a direction associated with the vertical height of the tablet when located in the brew chamber this is not essential. Alternatively, the sensor may be configured to measure the characteristic of another characteristic dimension of the beverage ingredient tablet, such as for example the horizontal width of the tablet when located in the brew chamber. The direction of measurement of the characteristic may also vary depending on the insertion orientation of the beverage ingredient tablet in the brew chamber.

Where the beverage ingredient tablet comprises a recess, recesses may be provided on the upper face, lower face or both upper and lower faces of the tablet.

BRIEF DESCRIPTION OF THE DRAWINGS

Examples of the present disclosure will now be described, by way of example only, with reference to the accompanying drawings, in which.

DETAILED DESCRIPTION

In this specification unless otherwise required by the context, the following terms have the following meanings:

"Roasted coffee" means a coffee substance that has been produced by the roasting of green coffee beans. The substance may be in the form of a roasted coffee bean or in some other form produced by onward processing steps such as grinding, decaffeination, pressing, etc. Particular examples of roasted coffee include roasted coffee beans, roasted expeller cake, roasted and flaked coffee.

"Roasted ground coffee" means a roasted coffee substance that has been subject to a comminution process in order to reduce the particle size of the original roasted coffee substance. Again, unless otherwise required by the context the comminution process may include one or more of grinding, chopping, pounding and crushing.

"Beverage ingredient tablet" means a tablet of powdered/granular material which is self-load-bearing such that it may be, for example, unwrapped, handled and placed in a beverage preparation machine without substantially disintegrating. The self-load-bearing capacity may be derived from compression of the tablet ingredients. In addition, or alternatively, the tablet may comprise one or more binding components. The beverage ingredient tablet may contain one or a mixture of ingredients. The ingredients may include, for example, roasted ground coffee, instant coffee, tea, milk powder, or instant soup. The tablet may also include one or more additional components, for example, foamers, bulking agents, colouring agents, binders, sweeteners, etc.

Figure 1:
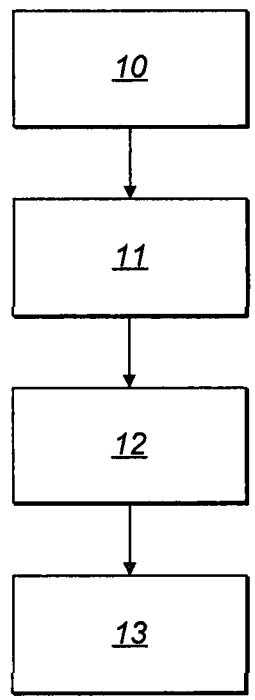
FIG. 1 is a flow chart of a method according to the present disclosure.

As shown in FIG. 1, the method of the present disclosure comprises a first step 10 of inserting a beverage ingredient tablet into a beverage preparation machine; a second step 11 of measuring a characteristic dimension associated with at least a portion of the beverage ingredient tablet to identify the beverage ingredient tablet; a third step 12 of configuring one or more dispense parameters of the beverage preparation machine based on the identification of the beverage ingredient tablet; and a fourth step 13 of operating the beverage preparation machine to dispense a beverage by contacting the beverage ingredient tablet with an aqueous fluid, such as hot water to dissolve the tablet.

Figure 4:
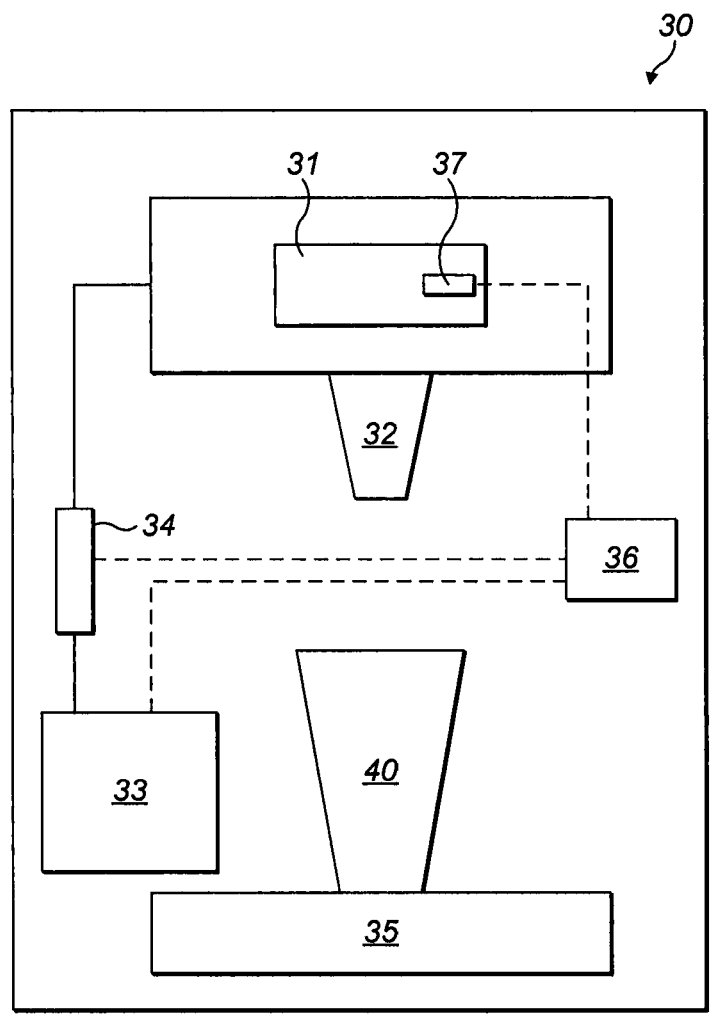
FIG. 4 is a schematic view of a beverage preparation machine according to the present disclosure including a brew chamber.

The beverage preparation machine 30 is shown schematically in FIG. 4 and comprises a brew chamber 31 which in use can receive a beverage ingredient tablet 20 therein. A source of water 33, which may be an internal reservoir of water or a connection to an external pressurised source of water such as a mains water supply, is connected to the brew chamber 31 via a flow heater 34. A pump (not shown) may be used to transport the water from the source 33 to the brew chamber 31. A cup stand 35 is provided on which a receptacle 40 may be placed to receive the dispensed beverage from an outlet 32 of the brew chamber 31. The brew chamber 31 also has associated with it a sensor 37 which is used to measure the characteristic associated with the thickness of the beverage ingredient tablet 20. A controller 36 is operatively connected to the sensor 37, flow heater 34 and the source of water 33 and/or pump where present to control operation of the beverage preparation machine 30. The controller 36 includes a program memory for storing details of a plurality of dispense parameters and operating instructions for the various components of the beverage preparation machine 30.

The source of water 33, flow heater 34 and cup stand 35 may all be of conventional design, the details of which are well known to the person skilled in the art. They will therefore not be described in further detail.

Embodiments of beverage ingredient tablet 20 are shown in FIGS. 2, and 3a to 3d.

Figure 2:
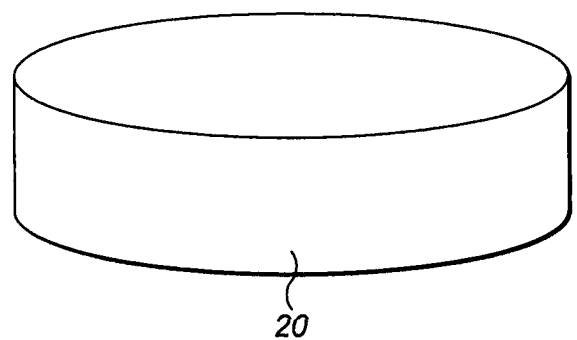
FIG. 2 is a schematic view of a first type of beverage ingredient tablet according to the present disclosure.
Figure 3A:
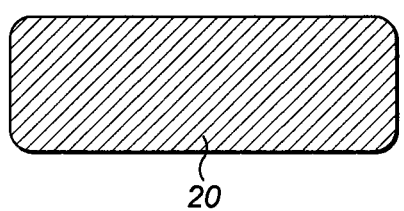
FIG. 3a is a cross-sectional schematic view of the tablet of FIG. 2.
Figure 3B:
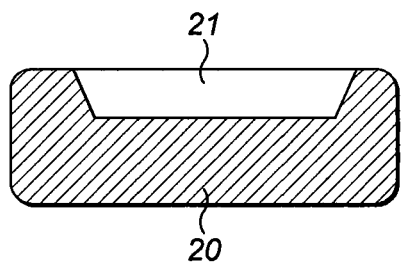
FIGS. 3b to 3d are cross-sectional schematic views of second, third and fourth types of beverage ingredient tablet according to the present disclosure.
Figure 3C:
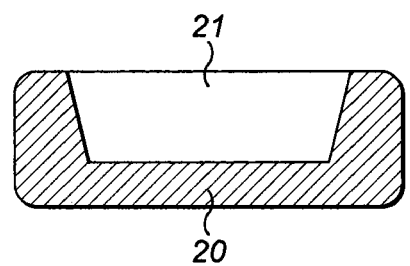

The beverage ingredient tablet 20 of FIGS. 2 and 3a is a first type of tablet that can be used. Each beverage ingredient tablet comprises a cylindrical tablet with a substantially planar upper and lower face. The thickness of the tablet between the upper and lower faces can be configured to be different for each intended beverage type. The following is one example:

| Thickness (mm) | Intended Beverage |
| --- | --- |
| 8 | Ristretto |
| 10 | Espresso |
| 12 | Café Crema |
| 16 | Coffee |
| 18 | Milk |
| 20 | Chocolate |

Figure 5:
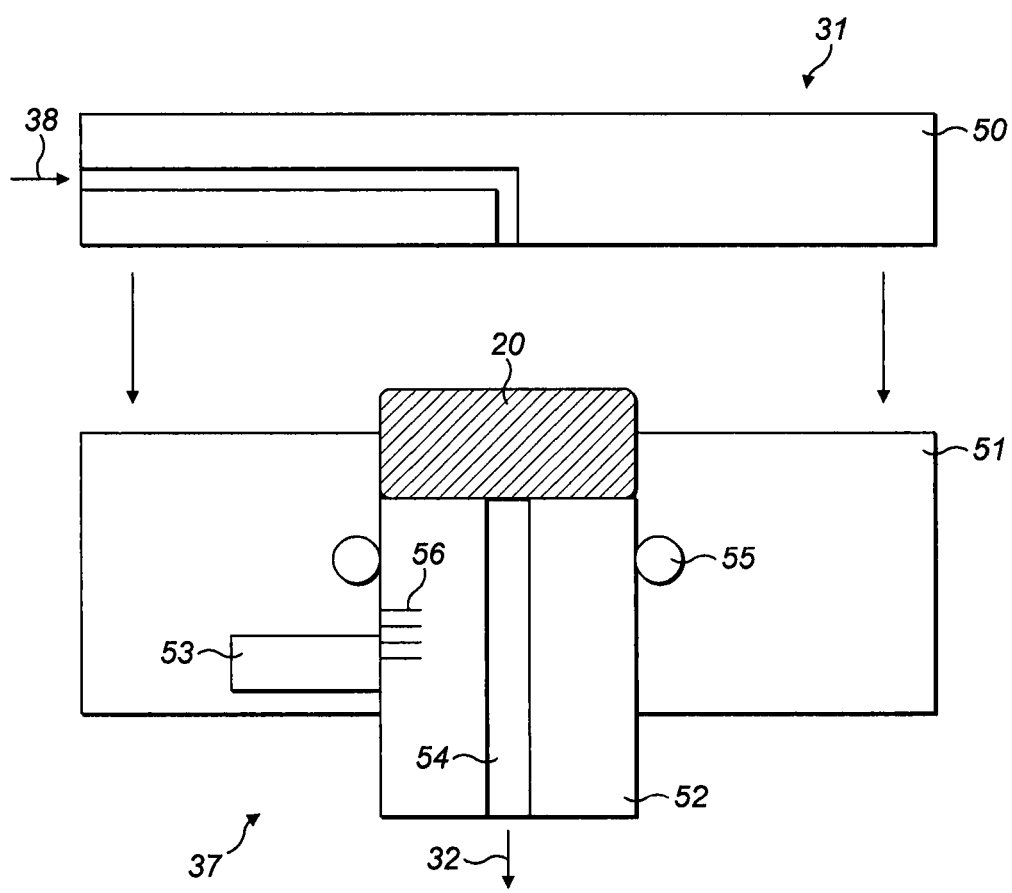
FIG. 5 is a schematic view of a first type of brew chamber for the beverage preparation machine of FIG. 4.

The beverage ingredient tablet 20 is designed to be used in a brew chamber 31 of the type shown in FIG. 5. The brew chamber 31 comprises an upper part 50 and a lower part 51. The upper part 50 is moveable between open and closed positions. In the closed position a sealed chamber is formed for receiving the beverage ingredient tablet 20 therein. A water inlet 38 is provided to the upper part 50 which is fluidly connected to the outlet of the flow heater 34. An outlet of the lower part 51 of the brew chamber is fluidly connected to the outlet 32 of the beverage preparation machine. The sensor 37 is mounted to, or formed as part of, the brew chamber 31. In the illustrated embodiment the sensor 37 is associated with the lower part 51 and comprises a movement-sensing part 53 and a displaceable probe part 52. The movement-sensing part comprises an optical detector. The displaceable probe part 52 comprises a piston having a series of graduations 56 printed on the side thereof. An upper end of the piston forms the lower end of the sealed chamber and forms the support for the beverage ingredient tablet 20. The piston is biased into an upward resting position. Dynamic seals 55 are located between the displaceable probe part 52 and the lower part 51.

In use, a consumer chooses a beverage ingredient tablet 20 of the required type, for example, an espresso tablet, and inserts it into the brew chamber 31 on top of the piston. The upper part 50 of the brew chamber is then closed causing it to contact the beverage ingredient tablet 20 and displace it and the piston downwardly. Consequently, the graduations 56 are displaced past the optical detector 53 which detects the degree of movement of the piston which is characteristic of the thickness of the tablet 20. The output from the optical detector 53 is fed to the controller 36 which configures the dispense parameters of the beverage preparation machine in accordance with a program stored in memory associated with the type of beverage ingredient tablet detected. Dispensation can then take place either automatically or on initiation of a further consumer input.

Figure 8:
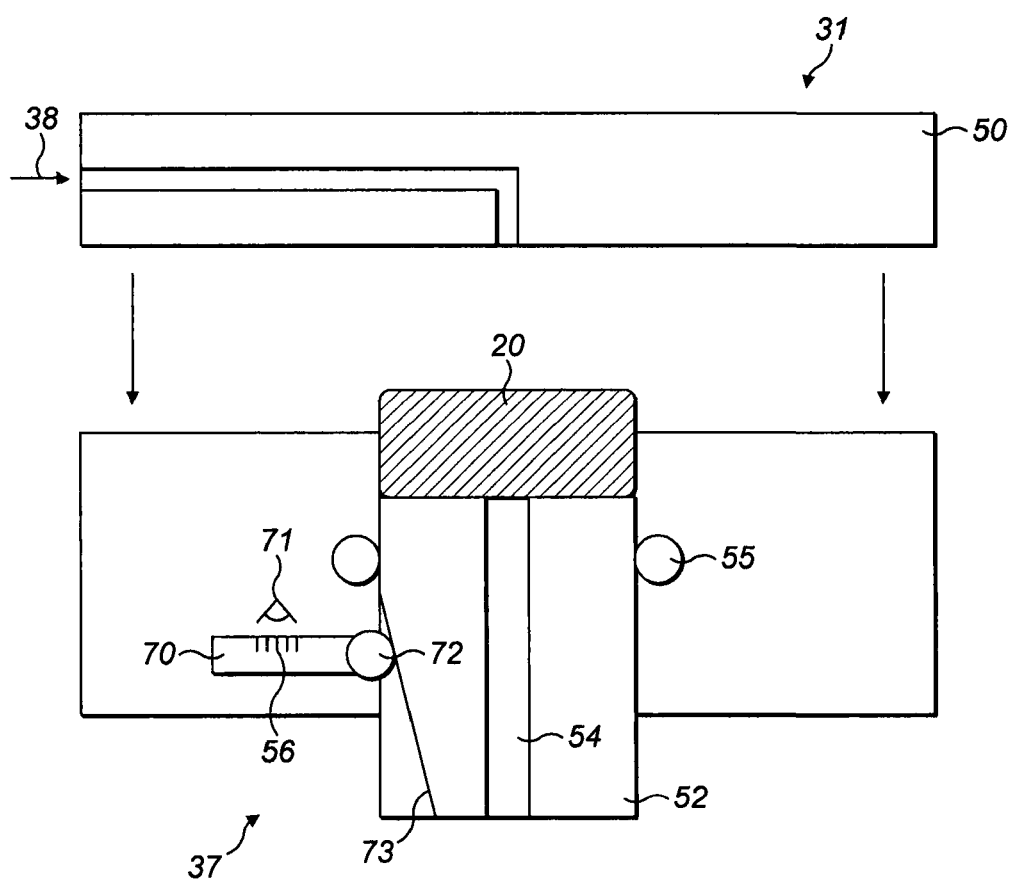
FIG. 8 is a schematic view of a fourth type of brew chamber for the beverage preparation machine of FIG. 4.

FIG. 8 illustrates an alternative brew chamber 31 that can make use of the tablets 20. As before, the brew chamber 31 comprises an upper part 50 and a lower part 51. In this alternative arrangement the sensor 37 comprises a movement-sensing part 70 and the displaceable probe part 52. The displaceable probe part 52 is provided with an angled surface 73 against which a head 72 of the movement-sensing part 70 is biased by a spring. The movement-sensing part 70 is provided with the graduations 56. An optical detector 71 is located in the lower part 51 arranged to detect movement of the graduations 56.

In use, as before, a beverage ingredient tablet 20 is inserted into the brew chamber 31 on top of the piston. The upper part 50 of the brew chamber is then closed causing it to contact the beverage ingredient tablet 20 and displace it and the piston downwardly. Downward movement of the probe part 52 causes sideways movement of the movement-sensing part 70 due to the interaction of the head 72 sliding along the angled surface 73. Consequently, the graduations 56 are displaced past the optical detector 71 which detects the degree of movement of the piston which is characteristic of the thickness of the tablet 20.

The beverage ingredient tablet 20 of FIGS. 3a to 3d can form a second type of tablet that can be used. Each beverage ingredient tablet 20 comprises a cylindrical tablet with a substantially planar lower face. However a recess 21 of varying depth is provided in the upper face. The thickness of the tablet between the bottom of the recess 21 and the lower face can be configured to be different for each intended beverage type. The following is one example wherein the nominal thickness of the tablet between upper and lower faces is 20 mm:

| Thickness (mm) | Intended Beverage |
|---|---|
| 0 | Espresso |
| 10 | Coffee |
| 15 | Milk |
| 20 | Chocolate |

Figure 3D:
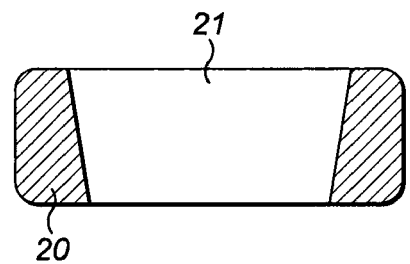

For the espresso tablet 20 of FIG. 3d it will be noted that the recess 21 extends through the entire tablet. For the Chocolate tablet 20 of FIG. 3a the recess is zero, i.e. there is no recess.

Of course the recess 21 could be alternatively provided in the lower face of the tablets or recesses in both faces could be utilised.

Figure 6:
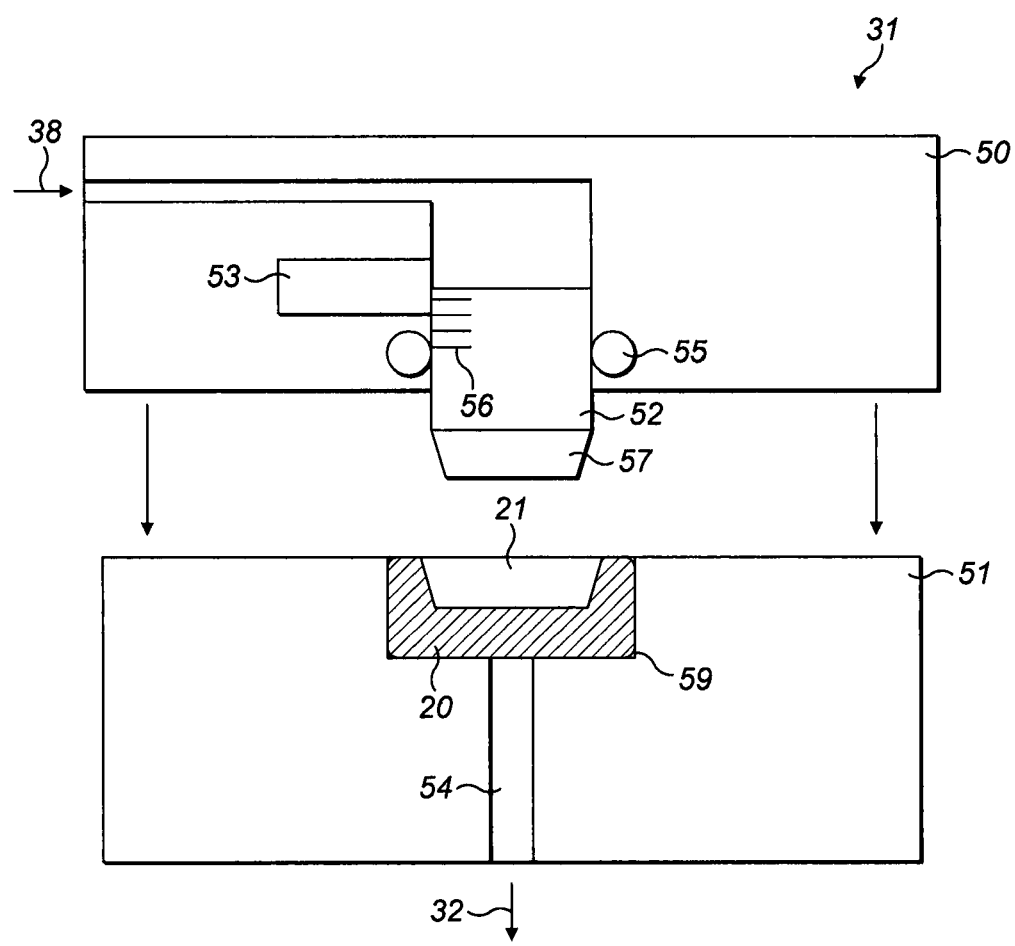
FIG. 6 is a schematic view of a second type of brew chamber for the beverage preparation machine of FIG. 4.
Figure 7:
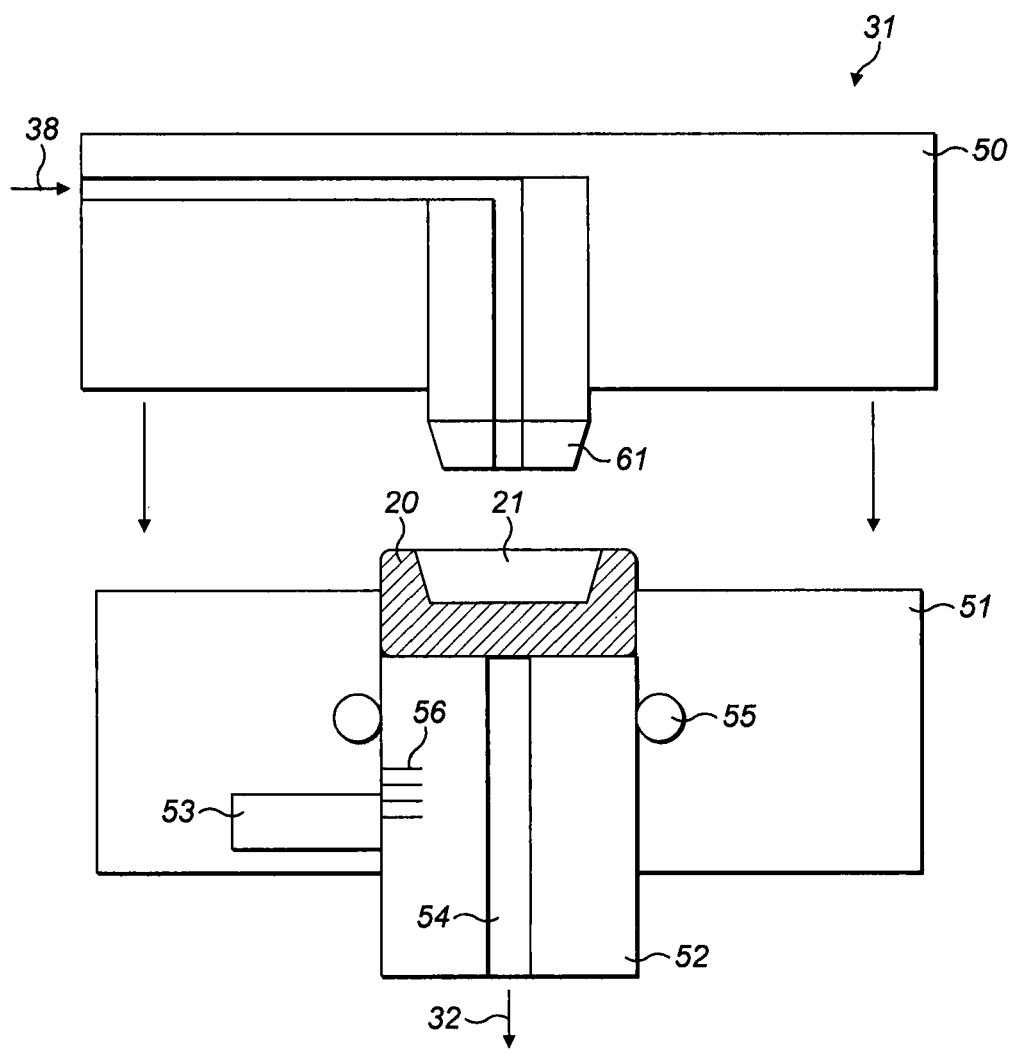
FIG. 7 is a schematic view of a third type of brew chamber for the beverage preparation machine of FIG. 4.

The beverage ingredient tablet 20 is designed to be used in a brew chamber 31 of the type shown in FIG. 6 or 7 which are similar to the brew chamber 31 of FIG. 5. Therefore only the differences there between will now be described.

In the embodiment of FIG. 6, the optical detector 53 and displaceable probe part 52 of sensor 37 are associated with the upper part 50 and comprises a movement-sensing part in the form of an optical detector 53 and a displaceable probe part in the form of a piston 52 as before. A lower end 57 of the piston has a tapered form configured to be receivable in the recess 21 of the beverage ingredient tablet 20. The piston is biased into a downward resting position. Dynamic seals 55 are located between the displaceable probe part 52 and the upper part 50. The lower part 51 comprises a hollow 59 for accommodating the tablet.

In use, a consumer chooses a beverage ingredient tablet 20 of the required type, for example, an espresso tablet, and inserts it into the hollow 59. The upper part 50 of the brew chamber is then closed causing the tapered portion 57 of piston 52 to enter the recess 21 and contact the base of the recess 21 (or contact the upper face when the tablet of FIG. 3a is used or to contact the hollow 39 when the tablet of FIG. 3d is used). Further closing movement of the upper part 50 causes the piston to move upwardly relative to the remainder of the upper part 50 and also the optical detector 53. Consequently, as before, the graduations 56 are displaced past the optical detector 53 which detects the degree of movement of the piston which is characteristic of the thickness of the portion of the tablet 20 extending between the base of the recess 21 and the lower face of the tablet. The output from the optical detector 53 is fed to the controller 36 which configures the dispense parameters as before.

In the embodiment of FIG. 7, the optical detector 53 and displaceable probe part 52 of sensor 37 are associated with the lower part 51 and comprises a movement-sensing part in the form of an optical detector 53 and a displaceable probe part in the form of a piston 52 as before. The piston is biased into a downward resting position. The upper part 50 comprises a projection 61 having a tapered end configured to be receivable in the recess 21 of the beverage ingredient tablet 20. The projection 61 is fixed relative to a remainder of the upper part 50.

In use, a consumer chooses a beverage ingredient tablet 20 of the required type, for example, an espresso tablet, and inserts it into the brew mechanism 31 to rest on top of the piston 52. The upper part 50 of the brew chamber is then closed causing the tapered portion of the projection 61 to enter the recess 21 and contact the base of the recess 21 (or contact the upper face when the tablet of FIG. 3a is used or to contact the piston 52 when the tablet of FIG. 3d is used). Further closing movement of the upper part 50 causes the piston to move downwardly relative to the remainder of the lower part 51 and also the optical detector 53. Consequently, as before, the graduations 56 are displaced past the optical detector 53 which detects the degree of movement of the piston which is characteristic of the thickness of the portion of the tablet 20 extending between the base of the recess 21 and the lower face of the tablet. The output from the optical detector 53 is fed to the controller 36 which configures the dispense parameters as before.

The dispense parameters that may be configured include the volume of water dispensed, the temperature of the water, the pressure of the water, the flow rate of the water, and the presence or absence of a pre-wet stage.

The invention claimed is:

1. A method of dispensing a beverage comprising:
   a) inserting a beverage ingredient tablet into a beverage preparation machine, the beverage ingredient tablet comprising at least one exterior surface and a recess in the at least one exterior surface, wherein the beverage ingredient tablet comprises a compacted powder tablet containing one or more powdered beverage ingredients;
   b) measuring a characteristic associated with the thickness of at least a portion of the beverage ingredient tablet between a bottom of the recess and an opposed exterior face to identify the beverage ingredient tablet by directly contacting the beverage ingredient tablet;
   c) configuring one or more dispense parameters of the beverage preparation machine based on the identification of the beverage ingredient tablet; and
   d) operating the beverage preparation machine to dispense a beverage by contacting the beverage ingredient tablet with an aqueous fluid to dissolve the tablet.

2. The method of claim 1 wherein the one or more dispense parameters are selected from the group comprising: temperature of the aqueous fluid; volume of the aqueous fluid dispensed; flow rate of the aqueous fluid; pressure of the aqueous fluid; and presence or absence of a pre-wet stage.

3. The method of claim 1 wherein in step b) a characteristic associated with the overall thickness of the beverage ingredient tablet from an uppermost surface to a lowermost surface is measured.

4. The method of claim 1 wherein the beverage ingredient tablet comprises a recess in at least one exterior surface and in step b) a characteristic associated with the thickness of the beverage ingredient tablet between a bottom of the recess and an opposed exterior face is measured.

5. The method of claim 1 wherein the beverage preparation machine includes a displaceable probe, and wherein the measuring the characteristic associated with the thickness of at least a portion of the beverage ingredient tablet comprises directly contacting the displaceable probe with the beverage ingredient tablet.

6. The method of claim 5, further comprising directly contacting the beverage ingredient tablet with the displaceable probe.

7. The method of claim 1, wherein the step of measuring includes directly contacting the beverage ingredient tablet with a displaceable probe.

8. The method of claim 1, wherein the beverage ingredient tablet inserted into the beverage preparation machine has been unwrapped.

9. The method of claim 1, further comprising the step of unwrapping the beverage ingredient tablet before the step of inserting the beverage ingredient tablet into the beverage preparation machine.

10. The method of claim 1,
- wherein the inserting the beverage ingredient tablet into the beverage preparation machine comprises inserting the beverage ingredient tablet into a brew chamber of the beverage preparation machine;
- wherein the directly contacting the beverage ingredient tablet comprises displacing the beverage ingredient tablet by bringing a portion of the brew chamber into direct contact with the beverage ingredient tablet; and
- wherein the displacing of the beverage ingredient tablet comprises displacing, via direct contact by the beverage ingredient tablet, a portion of a sensor configured to measure the characteristic associated with the thickness of at least a portion of the beverage ingredient tablet.

\* \* \* \* \*